United States Patent [19]

Reno

[11] Patent Number: 4,520,472
[45] Date of Patent: May 28, 1985

[54] BEAM EXPANSION AND RELAY OPTICS FOR LASER DIODE ARRAY

[75] Inventor: Charles W. Reno, Cherry Hill, N.J.

[73] Assignee: RCA Corporation, Princeton, N.J.

[21] Appl. No.: 464,658

[22] Filed: Feb. 7, 1983

[51] Int. Cl.³ .......................... G11B 7/00; G11B 7/14; G02B 13/08

[52] U.S. Cl. .................................. 369/112; 369/122; 358/347; 358/294

[58] Field of Search ................. 369/112, 122, 121, 45; 358/347, 294; 350/400, DIG. 1, 502; 331/DIG. 1; 372/43

[56] References Cited

U.S. PATENT DOCUMENTS 4,397,527 8/1983 Geyer .................................. 350/400

Primary Examiner—Robert L. Richardson
Attorney, Agent, or Firm—Joseph S. Tripoli; Robert L. Troike; Christopher Lyle Maginniss

[57] ABSTRACT

An optical record and playback system is described for use in a multi-channel data processing system. An optical head which includes a laser diode array comprises a collection objective, an anamorphic beam expander, a relay lens and a focusing lens having a finite conjugate. The optical head collects the laser beams emitted by the diode array, expands the beam cross-section to form circular beams and focuses the beams to diffraction limited spots. In operation the relay lens is used to image the lasing spots from the laser diode array in the conjugate plane of the finite conjugate focusing lens.

13 Claims, 5 Drawing Figures

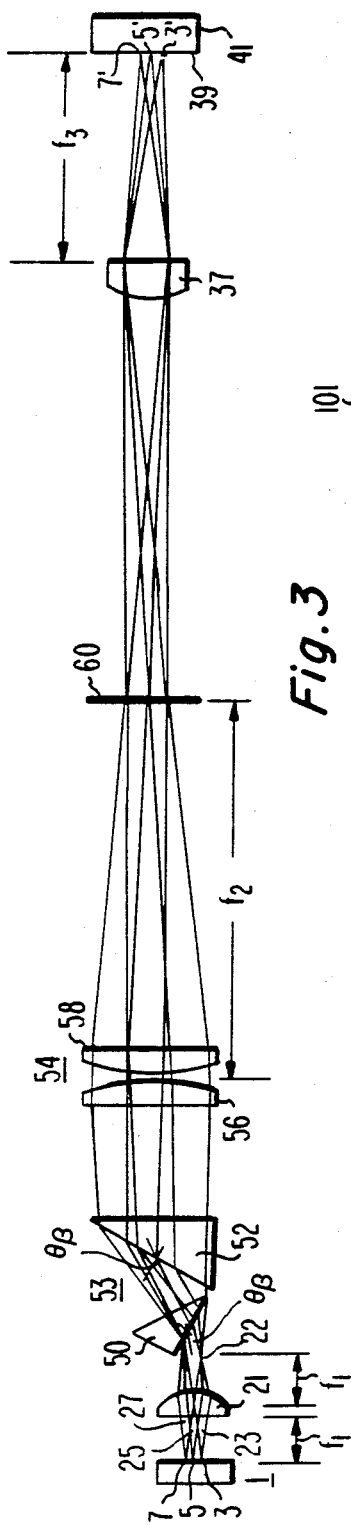
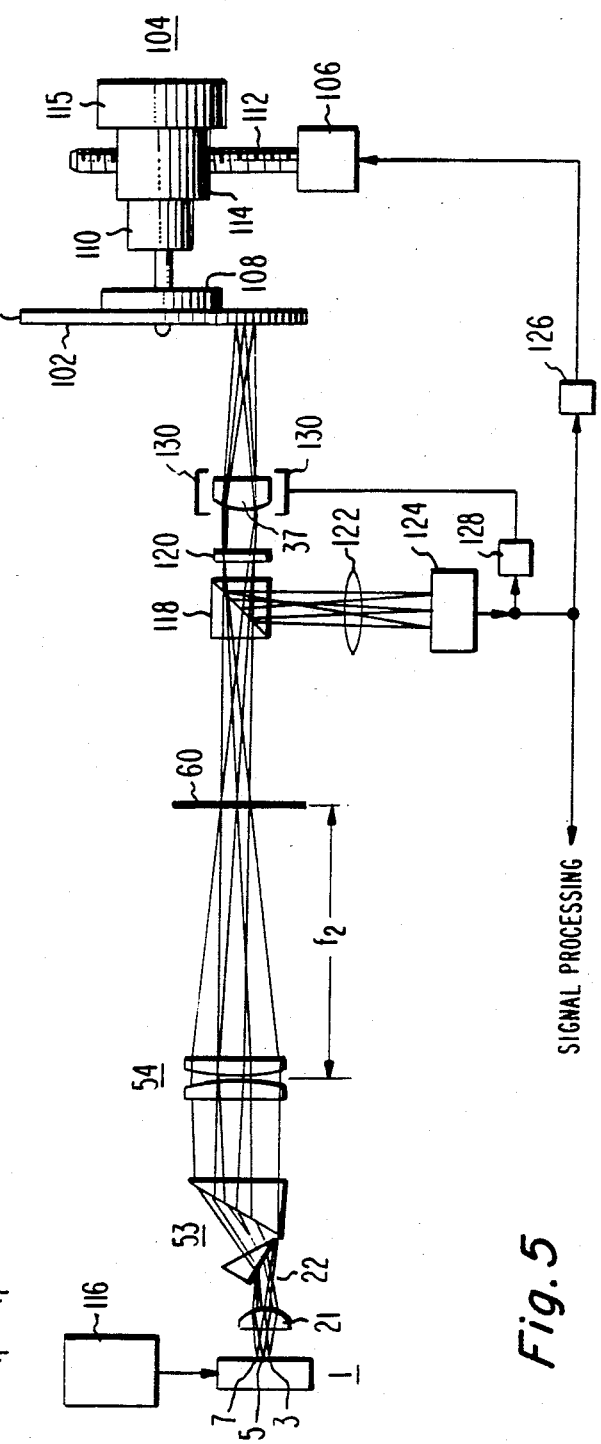

BEAM EXPANSION AND RELAY OPTICS FOR LASER DIODE ARRAY

This invention relates generally to apparatus for optically reading and recording high density information, digital or analog, on the surface of a record medium and, more particularly, to apparatus for optically reading and recording data at extremely high data rates where multiple beams are used.

BACKGROUND OF THE INVENTION

Optical recording/playback of information has been made possible by developments in the areas of lasers and thermal record media. Recent developments have led to mass data storage systems utilizing a plurality of individually modulated laser beams to record information at extremely high data rates. For example, in U.S. Pat. No. 4,449,212 issued on May 5, 1984, in the name of the instant inventor, a multi-track record/playback apparatus is described. In the multi-track apparatus the light beam from a single high power laser is split into a plurality of beams which are individually modulated and focused onto the surface of a record medium. In general, systems of this type require large, high power lasers which require external cooling. Furthermore, in these systems a modulator is provided to individually modulate each beam of the multiple beams being used for recording. For these reasons, prior art multi-beam systems tend to be bulky, low in efficiency, and difficult to modulate.

The development of semiconductor laser arrays is the first step to multi-channel optical recorders/players which overcome some of the problems of the prior art multi-channel systems. A diode laser array system is generally more compact, has higher efficiency, and requires no external modulation.

SUMMARY OF THE INVENTION

In accordance with the principles of the present invention an optical system is provided which utilizes an array of solid state elements which emit coherent light beams.

In accordance with an aspect of the present invention an optical system for processing information on the surface of a record medium is provided. The system includes an array of solid state elements emitting respective coherent light beams having generally elliptical cross-sectional shapes. A first lens is provided for collecting the respective coherent light beams emitted by the array of solid state elements. The first lens has a flat field over the extent of the array such that the first lens collects the light emitted by each element in the array. Further, this first lens forms the respective coherent light beams into collimated light beams and has an effective exit pupil one focal length beyond the principal plane of the first lens from which the collimated light beams diverge. A beam expander reshapes the cross-sectional shape of the collimated light beams. That is, the beam expander anamorphically expands the collimated light beams such that the cross-section of the collimated light beams is generally circular. Further, the system includes a lens system for focusing the collimated light beams as diffraction limited spots on the surface of the record medium. The lens system has a finite conjugate and an entrance pupil from which the collimated light beams are focused onto the surface of the record medium. A second lens is provided for relaying the exit pupil of the first lens into the entrance pupil of the lens system. The second lens forms an image of the array of solid state elements in the finite conjugate plane of the lens system.

BRIEF DESCRIPTION OF THE DRAWING

In the drawing:

FIG. 3 illustrates an optical system which may be used in a multi-channel optical recorder/player in accordance with the principles of the present invention;

FIG. 5 is a diagrammatic view of an information processing system including an optical arrangement of the embodiment shown in FIG. 3.

DETAILED DESCRIPTION OF THE PREFERRED EMBODIMENTS

Figure 1:
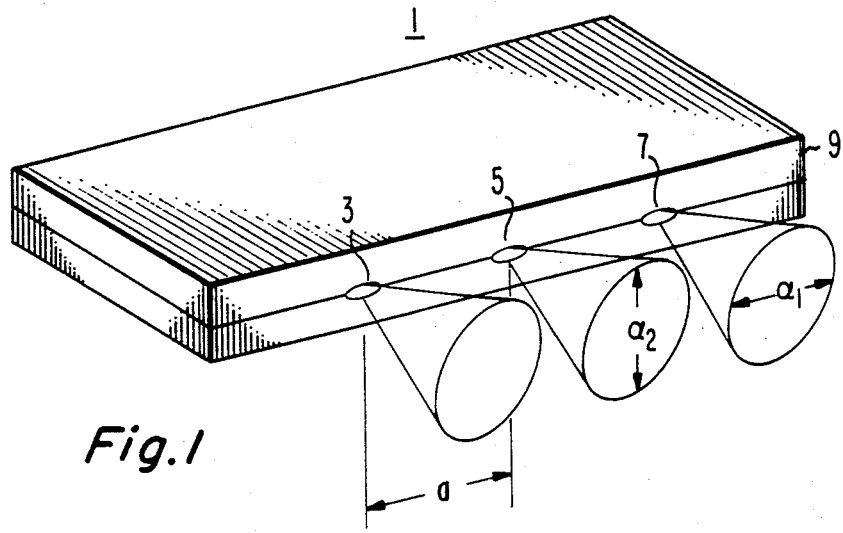
FIG. 1 shows a linear array of solid state laser elements which may be used in the present invention.

In FIG. 1, numeral 1 designates a semiconductor laser array. According to the invention, information can be simultaneously recorded onto a plurality of tracks by employing a plurality of (illustratively 3) lasing points 3, 5, 7 from a common substrate 9. The individual lasing points 3, 5, 7 are separated by distance a. The emitting areas of the laser diodes (lasing points) have high aspect ratios and hence widely different emission patterns for the long and short dimensions. For this reason, an anamorphic lens system is used to reshape the emission pattern into symmetrical beams, i.e., circular beams, so that the highest possible spot intensity can be obtained at the recording surface. Achieving the extremely high data rate requires operating multiple record/playback channels in parallel. Electrically modulating each laser diode separately allows recording independent parallel data tracks with an overall data rate that is a product of the data rate for each track and the number of tracks. Playback of the recorded information can be accomplished by lowering the power level to the array, inhibiting modulation, and detecting the reflected light from the disc with an array of photodetectors.

In general, due to the high aspect ratio of the emitting area of the laser diodes the far-field patterns of the light beams emitted from the lasers will be elliptical in cross-section. As shown in FIG. 1, the beam diverges at an angle $\alpha_1$; at $1/e^2$ intensity for a Gaussian beam, parallel to the junction plane and diverges at an angle $\alpha_2$ at $1/e^2$ intensity perpendicular to the junction plane. The anamorphic ratio may be defined by $\alpha_2/\alpha_1$. Illustratively, the anamorphic ratio for a diode of a double heterostructure with a large optical cavity is approximately 4.

Figure 2:
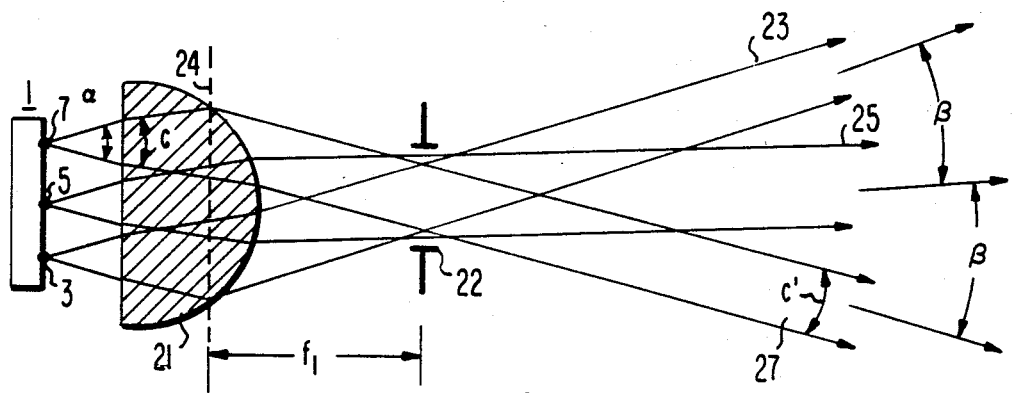
FIG. 2 illustrates how a collection objective collects and collimates the light beams emitted by an array of diodes as shown in FIG. 1.

Referring to FIG. 2, the collection objective and diode array according to the invention are shown. In the figures elements designated with like reference numerals are the same or similar items in the various figures. For single laser systems, a collection objective may be used to collect an collimate the light from a single lasing source and collimate it into a parallel beam. However, the light output from an array 1 of diodes 3, 5, 7 are collected into collimated, but not parallel, beams 23, 25, 27, respectively, by a collection objective lens 21. Illustratively, collection objective lens 21 may be a plano-objective microscope objective. In a three element system the beams from the sources at the extreme of the array, i.e., beams 23 and 27, diverge at angle $\beta = \Delta/f$ (where $\Delta$ is the distance from the axis and f is the focal length) with respect to the optical axis of the system. As the separation between the collection lens to the focusing lens (not shown) increases the beams 23 and 27 are further separated from each other. As a result a majority of the laser beams of the system may miss the aperture of the focusing lens. This problem can be solved to a certain extent by moving the lasing points 3, 5 and 7 closer together. However, from the viewpoint of the thermal and electronic interference of adjacent lasing points, the distance between adjacent points should be at least about 150 micrometers. If the beams diverge too much the truncation of the beams becomes very large. As the number of lasing points increase the beam on the edges of the array may not be introduced into the focusing lens.

The collection lens has an exit pupil 22 positioned a focal length ($f_1$) from a principal plane 24 of lens 21. At the exit pupil 22 of collection objective 21 the collimated bundles of beams 23, 25 and 27 are coincident. From exit pupil 22 the collimated beams diverge at angles from the optical axis.

In accordance with the principles of the present invention multi-channel optics for a laser diode array are provided. FIG. 3 is a diagram showing the construction of one embodiment for the optics of the present invention. Beams 23, 25 and 27 are emitted from sources 3, 5 and 7, respectively, of a laser diode array 1. A collection lens 21 is arranged one focal length distance from the laser device 1 to the primary principal plane of collecting lens 21 and renders the exiting beams as collimated beams 23, 25, 27. The collimated beams 23, 25, 27 are incident on the incoming prism 50 of anamorphic beam expander 53 which comprises prisms 50 and 52. Anamorphic beam expander 53 is positioned with the incident angle on prism 50 being the Brewster angle $\theta_B$. In FIG. 3, the beam from the semi-conductor laser device 1 is set at the polarization in which the electric field vector vibrates in the plane parallel to the sheet of the figure. The collection objective lens 21 is arranged in its focal position with respect to the laser device 1 and renders the incident beams of prism 50 as collimated beams. With that polarization and the beams incident on the surface of prism 50 at the Brewster angle there is, theoretically, no reflection from the surface. The beams are reflected by prisms 50 and 52 such that the beams that exit from prism 52 are parallel to the original optical axis. The refraction of the beams through prisms 50 and 52 expands the beams in a plane parallel to the paper while leaving the beams unaffected in a plane perpendicular to the sheet of the figure. Thus, the beams exiting from prism 52 are generally circular in cross-section. The beams which exit from prism 52 are incident on relay optics 54 consisting of a doublet of lenses 56 and 58. The relay doublet 54 could possibly be a singlet if the aberrations of the singlet lens can be tolerated. The relay lens system 54 images the lasing points 3, 5 and 7 of array 1 at plane 60 which is the focal plane of lens system 54. The focusing lens 37 which is chosen to be a finite conjugate lens has its finite conjugate plane coincident with the image plane 60. From here the spots are imaged as 3', 5' and 7' on surface 39 of record medium 41. Illustratively, record medium 41 may be of a type disclosed in U.S. Pat. No. 4,222,071 issued in the name of A. E. Bell et al. Illustratively, a Bell-type record medium may be a disc having a light sensitive surface upon which ablative recording by the thermal effects of a focused laser beam may be made. The effect of the relay lens 54 is to take the exit pupil 22 of objective lens 21 where the beams emitted by laser diodes 3, 5 and 7 are coincident and image that exit pupil 22 into the entrance pupil of lens 37, i.e., completely filling lens 37 to form diffraction limited spots 3', 5' and 7' on surface 39. The magnification of the beams can be adjusted by varying the doublet design.

Assuming that $\alpha_1$ is 12° and $\alpha_2$ is 48° providing an anamorphic ratio of 4 and the separation of adjacent lasing points is 150 μm, lenses 21 and 37 may have focal lengths of, illustratively, 8 mm and 4.6 mm, respectively, and numerical apertures of 0.45 and 0.66, respectively. Illustratively prisms 50 and 52 may be formed of glass (illustratively, Schott SF 18) having an index of refraction of 1.722. When taking into account the $1/n^2$ angular expansion of the prism beam expander the spacing between the focused points at the surface 39 of record medium 41 will be equal to 0.029 mm. If 0.029 mm between the focused spots is too great the separation between tracks may be reduced by rotating the optical axis of the system with respect to the relative motion of the medium.

Figure 4:
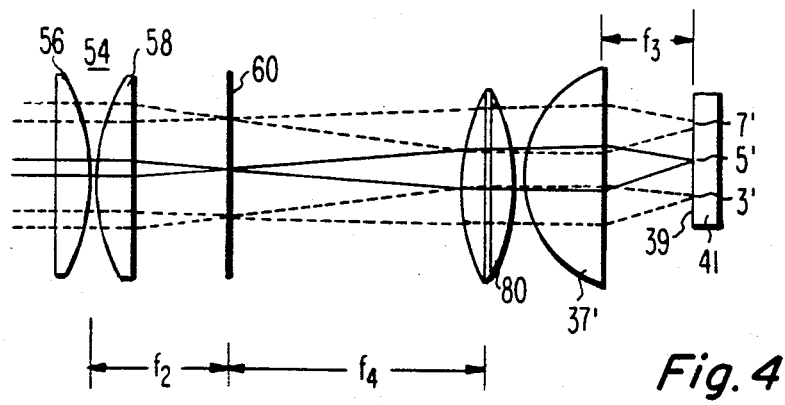
FIG. 4 illustrates a portion of the system of FIG. 3 showing an additional embodiment of the invention.

Referring to FIG. 4 a lens system is shown which is a modification of the lens system of FIG. 3 which permits the use of a focusing objective 37' having an infinite conjugate. According to this system a collimating lens 80 is positioned one focal length of lens 80, i.e., $f_4$, from plane 60 to which the image of the lasing spots 3, 5, 7 is relayed by relay lens system 54. Collimating lens 80 provides an infinite conjugate for lens 37' which is used to focus the beams to diffraction limited spots 3', 5', 7' on the surface 39 of record medium 41.

Referring to FIG. 5 an optical system for recording onto and reading information from a disc-shaped record medium will be described. A disc 101 having a light sensitive surface 102 (illustratively, of a Bell-type) is provided for recording and playback. To provide optical scanning of the surface 102 of disc 101, transport stage 104 is moved linearly by motor 106 at a rate in accordance with the desired recording or playback mode while disc 101 is rotated on turntable 108 by motor 110. Transport stage 104 comprises a tracking motor 106 and a feedscrew 112 adapted to be rotated in response to rotations of motor 106. Feedscrew 112 is in mesh engagement with slide 114. When motor 106 is activated slide 114 moves on platform 115 so that the light beam focused on the disc surface moves radially with respect to disc 101. In operation the light output from laser array 1 is modulated by signal source 116. The beams from laser array 1 are collected in collecting objective 21 and anamorphically expanded in beam expander 53. From there the beams are transmitted through relay lens 54, polarizing beam splitter 118 and quarter-wave plate 120 to focusing lens 37. Focusing lens 37 focuses the beams to diffraction limited spots on surface 102 of disc 101. As the disc is rotated signal source 116 modulates the beams from laser array 1 such that the information from signal source 116 is recorded on the surface of the disc. The modulated record beams are focused on the disc surface to form a series of surface variations on the surface of the disc of varying duration and spacing as the disc rotates. The pattern of surface variations on the disc is recorded in consonance with the signal provided to the input from signal source 116.

In the read mode the intensity of the array 1 is reduced such that the surface of disc 101 is no longer affected. The polarization of the beams is such that on the first pass through polarizing beam splitter 118 the beams pass through without being reflected thereby. Transmission of the beams through quarter-wave plate 120 effects a shift of linear polarization to circularly polarized light and a second pass back through quarter wave plate 120 shifts the circularly polarized light back to linearly polarized which is 90° out of phase with respect to the input light. Thus the beams that enter polarizing beam splitter 118 on the return are deflected by polarizing beam splitter 118 to enter lens 122. Lens 122 images the surface of the disc onto a plurality of detectors (not shown) on substrate 124. The signal outputs from the detectors on substrate 124 are passed through to signal processing circuitry (not shown). Furthermore, the signals from detector 124 may be used to control the position of the beam landing point on the surface 102 by controlling via driver 126 the motor 106 for translating the disc. Additionally, the signal from the detectors on substrate 124 may be used to control the position of lens 37 to maintain the laser beams in focus on the surface of the disc by means of driver 128 which is coupled to a voice coil arrangement 130 for moving lens 37 along the optical axis.

While the principles of the present invention have been demonstrated with particular regard to the illustrated structure of the figures, it will be recognized that various departures from such illustrative structures may be undertaken in practice of the invention. For example, in the embodiments where the lenses have been shown as single element devices multiple element lenses may be used in their place.

What is claimed is:

1. An optical system for transducing information on the surface of a record medium, comprising:
    an array of solid state elements emitting respective coherent light beams having generally elliptical cross-sectional shapes;
    a first lens, having a focal length $f_1$, for collecting said respective coherent light beams emitted by said array of solid state elements, said first lens having a flat field over the extent of said array such that said first lens collects the light emitted by each element of said array and forming said respective coherent beams into collimated light beams, said first lens having an exit pupil at a distance $f_1$ from a principal plane of said first lens from which said collimated light beams diverge;
    a beam expander for anamorphically expanding said collimated light beams to reshape the cross-section of said collimated light beams such that the cross-sectional shape of said collimated light beams is generally circular;
    a lens system for focusing said collimated light beams as a diffraction limited spots on said surface of said record medium, said lens system having a finite conjugate and an entrance pupil from which said collimated beams are focused on said surface of said record medium; and
    a second lens for relaying said exit pupil of said first lens into said entrance pupil of said lens system, said second lens forming an image of said array of solid state elements in the finite conjugate plane of said lens system.

2. The optical system according to claim 1 wherein said solid state elements are arranged in a linear array on a common substrate.

3. The optical system according to claim 2 wherein said solid state elements are spaced apart by 150 μm.

4. The optical system according to claim 1 wherein said lens system comprises a focusing objective having an infinite conjugate and a third lens, said third lens being a collimating lens positioned to collimate said relayed light beams such that said exit pupil of said first lens is imaged to the entrance pupil of said focusing objective.

5. The optical system according to claim 4 wherein said first, second, third lenses and said focusing objective are spherical lenses.

6. The optical system according to claim 1 wherein said beam expander includes a pair of prisms for reshaping the cross-sectional shape of said beams.

7. The optical system according to claim 1 wherein said second lens comprises a lens doublet for minimizing lens aberrations.

8. An optical system for processing information on the surface of a record medium, comprising:
    an array of solid state elements emitting respective coherent light beams having generally elliptical cross-sectional shapes;
    a first lens, having a focal length $f_1$, for collecting said respective coherent light beams emitted by said array of said solid state elements, said first lens having a flat field over the extent of said array such that said first lens collects the light emitted by each element of said array and forming said respective coherent light beams into collimated light beams, said first lens having an exit pupil at a distance $f_1$ from a principal plane of said firt lens from which said collimated light beams diverge;
    a beam expander for anamorphically expanding said collimated light beams to reshape the cross-section of said collimated light beams such that the cross-sectional shape of said collimated light beams is generally circular;
    a second lens, having a focal length $f_2$, for focusing said collimated beams as respective diffraction limited spots on said surface of said record medium, said second lens having a finite conjugate;
    a third lens for relaying said exit pupil of said first lens into the entrance pupil of said second lens, said third lens forming an image of said array of solid state elements in the finite conjugate plane of said second lens.

9. The optical system according to claim 8 wherein said solid state elements are arranged in a linear array on a common substrate.

10. The optical system according to claim 9 wherein said solid state elements are spaced apart by 150 μm.

11. The optical system according to claim 8 wherein said beam expander includes a pair of prisms for reshaping the cross-sectional shape of said beams.

12. The optical system according to claim 8 wherein said third lens comprises a lens doublet for minimizing lens aberrations.

13. The optical system according to claim 8 wherein said first and second lenses have focal lengths of 8 and 4.6 mm, respectively.

* * * * *